United States Patent [19]

Billet

[11] 4,212,380

[45] Jul. 15, 1980

[54] TORSION DAMPING ASSEMBLY FOR FRICTION CLUTCHES

[75] Inventor: René Billet, Lamorlaye, France

[73] Assignee: Societe Anonyme Francaise du Ferodo, Paris, France

[21] Appl. No.: 891,769

[22] Filed: Mar. 30, 1978

[30] Foreign Application Priority Data

Apr. 4, 1977 [FR] France .................................. 77 10034

[51] Int. Cl.² ............................ F16D 3/14; F16D 3/66
[52] U.S. Cl. ................................. 192/106.2; 64/27 C; 64/27 F
[58] Field of Search .......................... 192/106.1, 106.2; 64/27 C, 27 F

[56] References Cited

U.S. PATENT DOCUMENTS

| 3,414,101 | 12/1968 | Binder et al. | 192/106.2 |
| 3,863,747 | 2/1975 | Werner et al. | 192/106.2 |

FOREIGN PATENT DOCUMENTS

| 1801969 | 10/1970 | Fed. Rep. of Germany | 192/106.2 |
| 2148286 | 4/1973 | Fed. Rep. of Germany | 192/106.2 |
| 1233273 | 5/1971 | United Kingdom | 192/106.2 |

Primary Examiner—Allan D. Herrmann
Attorney, Agent, or Firm—Charles E. Brown

[57] ABSTRACT

A torsion damping assembly comprising a first part including a hub and a web radially extending around the hub. The hub and web are coaxial to each other and rotatably mounted with respect to each other against the force of centering springs for predetermined relative angular displacement within limits defined by at least one meshing member, a tooth or a notch, on the hub intermeshing with a complementary notch or tooth on the web. A friction washer is also provided with a meshing member similar to the meshing member on the web and also intermeshing with the complementary meshing member on the hub. The circumferential play between the meshing member on the friction washer and the meshing member on the hub is less than the circumferential play between the meshing member on the web and the meshing member on the hub. Alternatively the meshing member on the friction washer may mesh without circumferential play with the meshing member on the hub. Preferably there are a plurality of uniformly spaced meshing members on the web, hub and friction washer.

4 Claims, 4 Drawing Figures

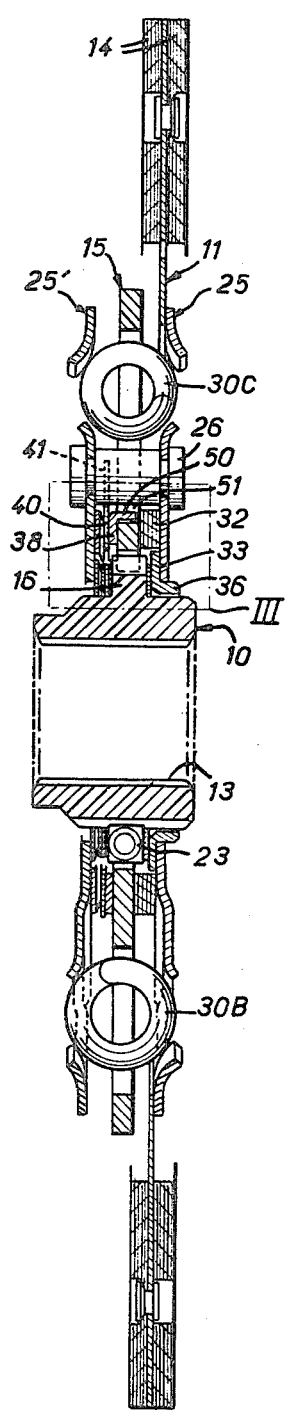
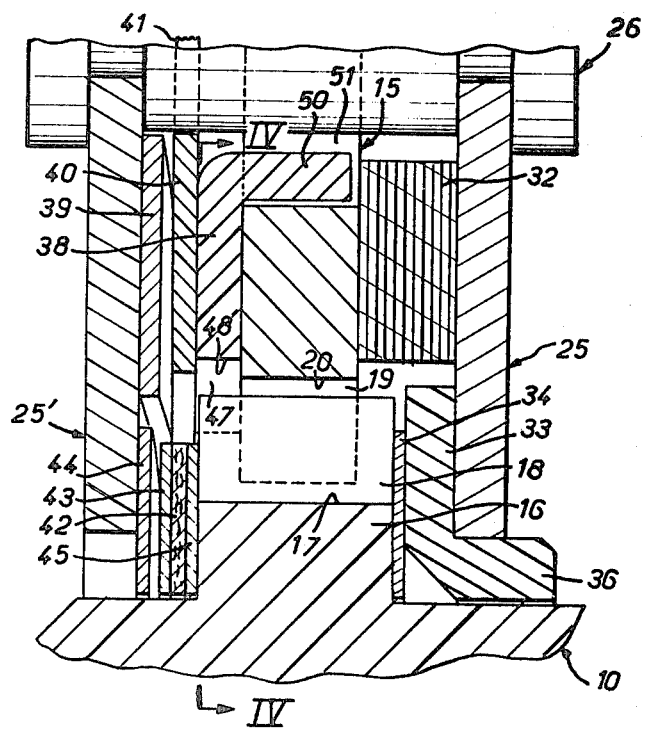
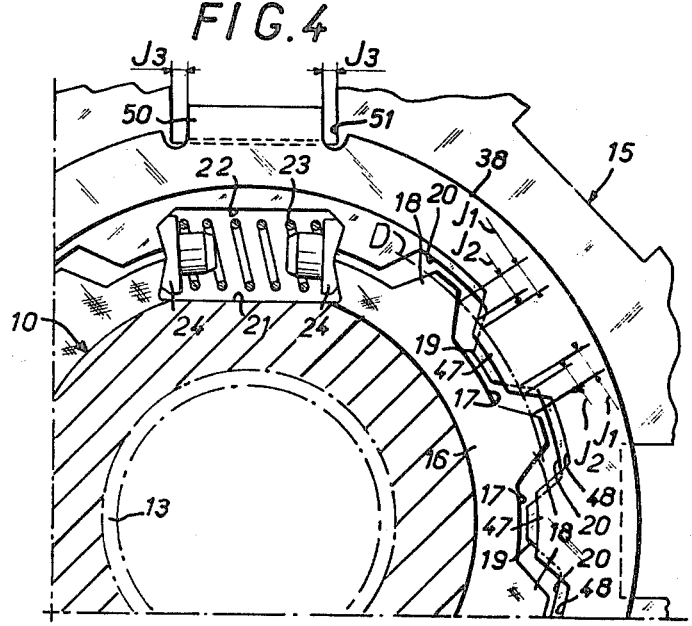

TORSION DAMPING ASSEMBLY FOR FRICTION CLUTCHES

BACKGROUND OF THE INVENTION

The present invention relates generally to torsion damping assemblies, namely for motor vehicles, of the type comprising two coaxial members, that is, a hub and a radially extending web disposed annularly around the hub, which are rotatably mounted with respect to each other against the force of resilient centering means, for predetermined relative angular displacement within limits defined by meshing means provided between said members, one of the members having at least one meshing member such as a tooth or a notch intermeshing with circumferential play with a complementary meshing member, such as a notch or a tooth, disposed on the other member facing the first meshing member.

In practice when such a torsion damping assembly is employed in a friction clutch assembly for a motor vehicle, the coaxial members together form a first part with which a second part is coaxially associated; the second part is rotatably mounted relative to the first part for predetermined relative angular displacement against the force exerted by circumferentially disposed resilient return means interposed between the parts and also carries a friction plate.

Such a torsion damping assembly inserted in a kinematic chain from an input shaft to an output shaft, enables a controlled transmission from one of the coaxial component parts to the other of torque which may be applied to one of the parts, that is, sufficient to regulate the angular velocity of the input shaft and thereby diminish the acceleration of the output shaft in order to prevent vibrations, particularly audible vibrations, which occur anywhere along the kinematic chain on which it is located.

More specifically, for small relative angular displacements between the component parts of such an assembly, the torque transmitted therebetween remains, advantageously, small as long as the meshing means provided between the component members of the first part, as briefly set forth above, do not cause one of the members to be positively driven by the other.

This assembly is adapted, for certain particular uses, namely motor vehicles, to prevent generating various noises, such as a gear box noise, or dead point noise, due to impacts produced between the teeth of gears of the gear box when it is in neutral, owing to periodic oscillations in the angular velocity of the engine inherent in the mode of operation of internal combustion engines.

Thus for small angular clearance or play between two component parts of such an assembly only the two component members of the first part vary in relative angular position, the second part being fixed circumferentially to the web constituting one of the members by circumferentially disposed resilient means interposed between the parts, which resilient means are stiffer than resilient means effecting the centering of the members relative to each other.

It is, moreover, known to insert between the two coaxial parts making up such a torsion damping assembly friction means adapted to introduce a "hysteresis" effect which results in a difference for a given relative angular displacement between the parts between the torque transmitted in a first direction of rotation, usually termed the forward direction, and the torque transmitted in the opposite direction, termed the reverse direction.

It has been established that for certain uses the hysteresis effect contributes to limiting the relative amplitude of oscillations of the rotatable parts concerned.

It is also known to provide friction means generating such a hysteresis effect by means of friction washers of which at least one is maintained axially in contact with the web forming one of the rotatable members of the torsion damping assembly.

Yet to the present day such friction washers are ineffective for small amplitude oscillations for which only the relative angular position of the coaxial members varies relative to each other, which coaxial members comprise the first of two component parts of the assembly.

Indeed, as pointed out above, for the small amplitude oscillations in question the second component part of such an assembly is fixed for rotation with the web which is part of the first part so that the friction washer(s) in contact with this web is not subjected to any rotational movement relative to the same and therefore does not develop any friction in contact therewith.

Now, when the oscillations of the torsion damping assembly are greater, the meshing means provided between the members forming the first of the component parts of the assembly positively drive the members relative to each other and the circumferentially disposed resilient means interposed between the parts come into action, there may be produced, taking account of the substantial stiffness of the resilient means relative to the stiffness of the resilient means reduced by the resilient centering means interposed between the members, an accidental rebounding of one of the members relative to the other part to interfere with the uniformity of the desired speed of output shaft which is usually the input shaft of the gear box and therefore liable to adversely affect sought after noise reduction.

SUMMARY OF THE INVENTION

An object of the present invention is to eliminate or at least very substantially reduce this drawback.

More specifically according to the invention there is provided a torsion damping assembly of the type comprising two coaxial members including a hub and a radial web disposed annularly around said hub, said coaxial members being mounted for relative angular displacement over a predetermined sector limited by meshing means including at least one radially oriented meshing member intermeshing with circumferential play with at least one complementary radially oriented meshing member facing the first mentioned meshing member, and a friction washer also having along its inner periphery a radially oriented meshing member similar to the meshing member on said web and also intermeshing with the corresponding meshing member on said hub.

For slight oscillations of such a torsion damping assembly, as is the case with present day torsion damping assemblies, the friction washer according to the invention does not come into action, but only the resilient centering means interposed between the two coaxial members which are part of the first component part of the assembly.

But, according to the invention, as distinguished from present day torsion damping assemblies, the friction washer in contact with the web or at least one of the friction washers, comes into action before the resilient means interposed between the component parts of the assembly, that is to say, before the end of oscillations of the assembly for which the relative angular displacement between the coaxial members of the first part is permitted.

Indeed, by reason of the lesser circumferential play or clearance the friction washer meshes with one of the members, in operation, assuming an initial relative oscillation of one of the members, the washer is driven by one of the members even before this member comes into positive contact with the other and therefore, starting with the driving action, a displacement of the friction washer relative to the web with which it is in contact.

The friction couple which then develops between the two members of the torsion damping assembly prevents possible rebounding by insuring accelerated damping thereof.

The intervention of the friction washer occurs advantageously without concomitant compression of any particular resilient means capable of subsequently restoring the potential energy produced during compression so that its angular displacement for a given direction of change of relative angular position of the component parts of the torsion damping assembly does not impart the resilient return to the initial position when the change in direction occurs.

On the contrary the friction washer advantageously possesses a variable zone of action depending on the action to which it was previously subjected, the friction developed in the torsion damping assembly for given direction of change in relative angular position between the members of the assembly occuring over a greater or lesser sector of the angular displacement, in accordance with the portion of the displacement over which comparable friction developed in the course of changes in relative angular position in the opposite direction, even during other relative oscillations of the members, so as to damp rebounding oscillations between the members.

Features and advantages of the invention will moreover be brought out in the following description, given by way of example, with reference to the accompanying schematic drawings.

BRIEF DESCRIPTION OF THE DRAWINGS

FIG. 2 shows an axial sectional view of the assembly taken along broken line II—II in FIG. 1;

FIG. 3 depicts on an enlarged scale a fragmentary portion enclosed in box III in FIG. 2; and FIG. 4 shows a fragmentary transverse cross-sectional view of the torsion damping assembly embodying the invention taken on line IV—IV in FIG. 3.

DETAILED DESCRIPTION OF THE PREFERRED EMBODIMENT

Figure 1:
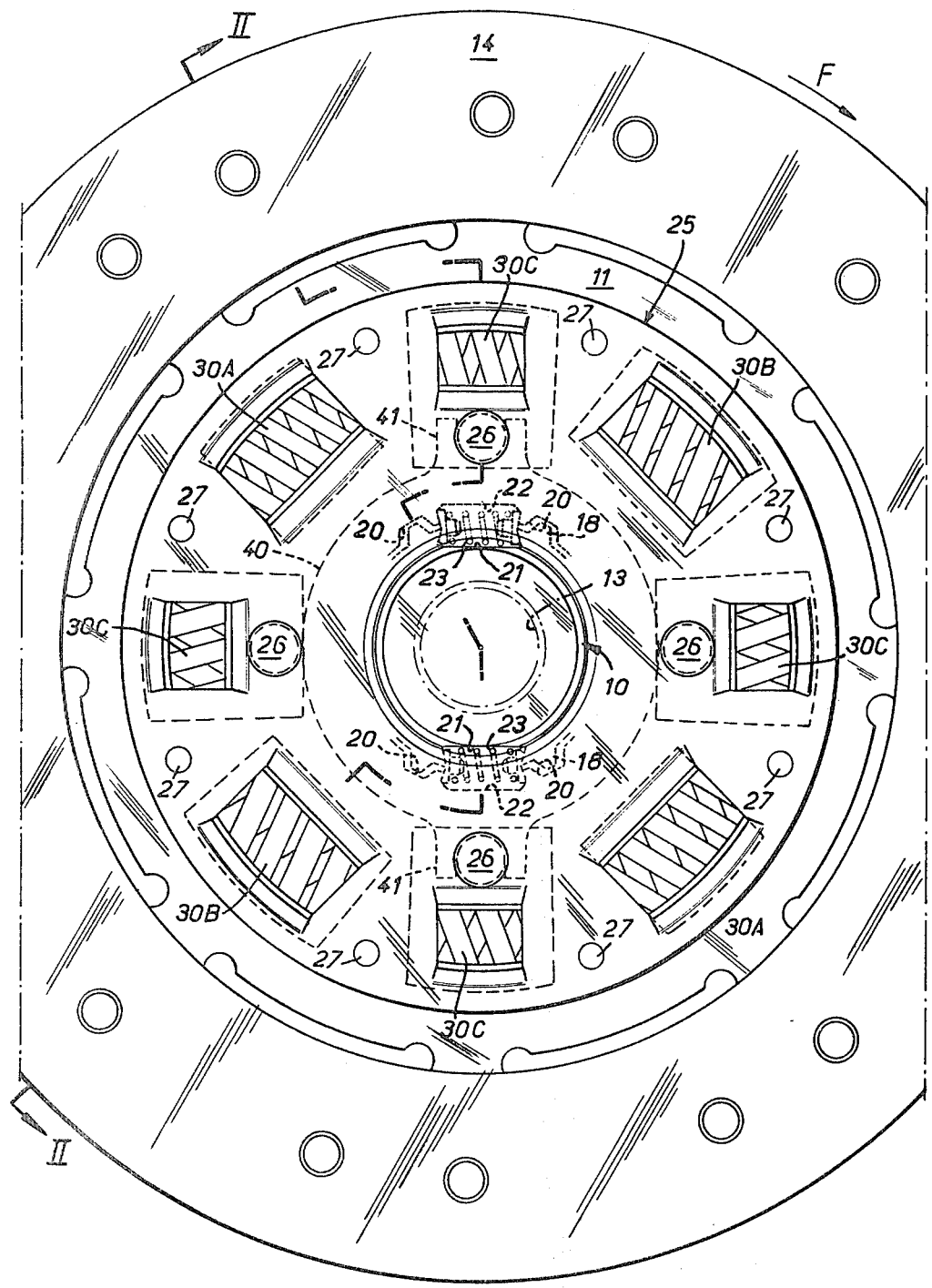
FIG. 1 shows a fragmentary elevational view of a torsion damping assembly embodying the present invention.

The drawings illustrate the present invention when embodying a damping hub friction clutch plate assembly, especially for a motor vehicle.

As is well known such a friction clutch comprises a torsion damping assembly including two coaxial parts rotatably mounted relative to each other within predetermined limits of relative angular displacement against the return force of resilient means. One of the parts comprises a hub 10 and the other a friction plate 11.

In a manner known per se, the hub 10 is provided at its inner periphery with splines 13 adapted for coupling it to a first shaft for rotation, in practice a driven shaft, and the friction plate 11 bears at its periphery along each face thereof friction linings 14 adapted to permit it to be gripped between two plates to couple it for rotation with a second shaft, in practice a driving shaft.

A first part of the torsion damping assembly comprises, besides the hub 10, a radial web 15 disposed annularly around the hub 10 in the middle thereof.

The hub 10 and the web 15 make up the two coaxial members rotatably mounted relative to each other for a predetermined sector of angular displacement limited by meshing means provided therebetween.

The meshing member or members on hub 10 is or are disposed on an outwardly projecting peripheral collar 16 at the middle of the hub covering only a portion of its axial length, each meshing member comprising a radially oriented notch 17.

In practice in the illustrated embodiment the collar 16 on the hub 10 has a plurality of identical notches 17 uniformly distributed circumferentially and alternating with teeth 18.

In association the web 15 comprises at its inner periphery facing the collar 16 on the hub 10 at least one tooth 19 comprising a complementary meshing member.

In practice, as above, the web 15 comprises at its inner periphery a plurality of such teeth 19 uniformly distributed circumferentially and alternating with notches 20 formed between consecutive teeth.

The teeth 19 on the web 15 are in radial engagement with the notches 17 in the collar 16 of the hub 10 and at the same time the teeth 18 on peripheral collar are in radial engagement with the notches 20 on the web 15.

In both cases the radial engagement includes circumferential play J1 to each side of the corresponding tooth in the rest position of the assembly as shown in FIG. 4.

In FIG. 4 and in order to better understand the invention, the play J1 is computed arbitrarily along a circumference D common to the coaxial members concerned.

The resilient centering means are provided between the members for mutually returning them to their centered position, illustrated in FIG. 4.

In the illustrated embodiment the resilient centering means are disposed in the meshing zone between the hub 10 and the web 15, the notches 21 and 22 facing one another along the peripheral collar 16 on the hub 10 and at the inner periphery of the web 15 respectively.

The resilient means comprise at least one spring 23 which extends generally tangentially between two bearing and centering members 24 each bearing, in the centered rest position of the assembly, in part on the collar 16 of hub 10 and in part on the web 15. Two springs 23 are preferably in diametrically opposed positions as illustrated.

The component parts of the torsion damping assembly comprise two annular guiding plates 25,25' which extend parallel to web 15 on each side thereof, connected to each other by spacer means.

In the illustrated embodiment the spacer means comprise a plurality of cylindrical spacer members 26 of circular cross section, four in number as shown, which extend axially from one of the annular guiding plates 25,25' to the other, riveted at their ends on the annular guiding plates after passing, with play, through windows in web 15, as described hereinafter.

At the same time the friction plate 11 which is part of the second component part is fixed to the annular guiding plate 25 by rivets 27, FIG. 1.

In a manner known per se the resilient means are disposed circumferentially and interposed between the component parts of the assembly; the resilient means comprise a plurality of springs which in the illustrated embodiment are oriented substantially tangentially to a given circumference of the assembly.

In the illustrated embodiment and according to a known arrangement which therefore will not be described in detail hereinafter there are three different sets of springs: first of all, two diametrically opposed springs 30A; then two diametrically opposed springs 30B at right angles to springs 30A and lastly four springs 30C disposed at right angles relative to one another and in alternating relation with springs 30A and 30B.

These various springs are accommodated in windows formed in part in web 15 and in part in annular guiding plates 25,25' and the friction plate 11; as for the web 15 the windows thereof are traversed by pins 26 with play.

According to an arrangement known per se which will therefore not be described in detail, the windows have different openings so as to permit, first, springs 30A to come into action, then springs 30B, and finally springs 30C in the course of relative angular displacement of the two coaxial component parts of the torsion damping assembly.

Also according to known arrangement, there is to the side of the annular guiding plate 25 a friction washer 32 axially disposed between the annular guiding plate 25 and the web 15, in contact with the latter.

The friction washer 32 extends radially only beyond the meshing zone between the web 15 and the hub 10, and in line with this zone a spacer ring 33 is inserted between the guiding plate 25 and collar 16 on hub 10 together with a metal washer 34 to avoid wear of the spacer ring 33 by cutouts forming notches between the teeth along the collar 16. In the illustrated embodiment the spacer ring 33 is integrally formed with a bearing sleeve 36 disposed radially between the hub 10 and the inner peripheral edge of the annular guiding plate 25.

To the side of the annular guiding plate 25', and likewise according to a known arrangement, there is also beyond the meshing zone between the web 15 and the hub 10 a friction washer 38 held axially in contact with the web 15 by axially acting resilient means bearing against the annular guiding plate 25'.

In the illustrated embodiment the axially acting resilient means comprise an Onduflex type resilient washer 39 and an equalizing washer 40 interposed between the resilient washer 39 and the friction washer 38 against which it bears.

At its outer periphery the equalizing washer 40 has at diametrically opposed positions two notched radial extensions 41 which are engaged on two pins 26 and thus fixed for rotation with the second component part of the torsion damping assembly of which the pins form a part.

As it will be easily understood the resilient washer 39 not only urges against the friction washer 38 but also against the friction washer 32 described above.

In the meshing zone between the web 15 and the hub 10 there is provided on the side of the annular guiding plate 25' a friction washer 42 which is carried by bearing washer 43 and an Onduflex type resilient washer 44 grippingly urges against the collar 16 of the hub 10 with a metal washer 45 interposed, as above, to avoid wear by the edges of the teeth along the collar 16.

Thus it is to be emphasized that the axial gripping of the friction washers 32 and 38, on the one hand, and the friction washer 42, on the other hand, occur independently by means of separate resilient washers 39 and 44.

According to the invention the friction washer 38 has at its inner periphery at least one radially extending tooth 47 which constitutes a meshing member of the same type as teeth 19 on web 15, and, like teeth 19, teeth 47 are received in the corresponding notches 17 on collar 16 of the hub, however, with circumferential clearance or play J2 less than circumferential clearance or play J1 associated with teeth 19.

In practice, the friction washer 38, like web 15, has at its inner periphery a plurality of similar radial teeth 47 which are uniformly circumferentially spaced and define between one another notches 48 in which teeth 18 on the collar 16 of hub 10 are in engagement with circumferential clearance or play J2 specified above.

In any event the circumferential clearance or play J2 is appreciated in the same manner as defined above with respect to the circumferential clearance of play J1.

Moreover, preferably, as illustrated, the friction washer 38 has at its outer periphery an axial tab 50 in engagement with circumferential clearance or play J3 to either side in notch 51 on web 15 which extends radially towards the axis of the windows in the web in which the springs 30C are accommodated.

The value of the play J3 is computed in accordance with the following relationship:

$$J1 - J2 \leq J3 \leq J1 + J2$$

When torque is applied to one of the coaxial parts of the assembly comprising annular guiding plates 25,25' and friction plate 11, for example in the direction of arrow F in FIG. 1, the coaxial part in question compresses all the springs 30A,30B,30C and therefore through springs 30A the web 15. The stiffness of the centering springs 23 interposed circumferentially between web 15 and hub 10 is chosen sufficiently small, particularly relative to the springs 30A,30B,30C so that the centering springs 23 themselves are not capable of transmitting appreciable torque and when the compression due to the relative angular displacement between web 15 and hub 10 there is practically no compression of springs 30A,30B,30C.

Centering springs 23 therefore do not impede the rotation of web 15 with respect to hub 10 and this rotation continues at substantially zero torque until the corresponding play or clearance J1 is taken up.

Once the clearance or play J1 has been taken up, the web 10 positively drives hub 10 owing to meshing means provided between the members being in positive engagement through their respective meshing members.

According to an arrangement known per se, the torque then transmitted between the coaxial parts of the torsion damping assembly augments gradually due to the various springs between the parts progressively coming into action, springs 30A first becoming operative alone, then springs 30B adding to their force to springs 30A and finally springs 30C adding their action to the preceding springs.

According to the invention, before taking up the clearance or play J1 fixing the coming of springs 30A, 30B, 30C into action the operative clearance or play J2 associated with friction washer 38 is taken up.

Before the springs 30A,30B,30C come into action the friction washer 38 is gripped between two members fixed for rotation with each other, that is, the equalizing washer 40 and web 15 and no frictional torque is developed therebetween. Thereafter the teeth 47 of the friction washer 38 come into contact with teeth 18 on hub 10 and abut against the same to cause angular displacement of hub 10 relative to web 15 and equalizing washer 40 that grips it.

Consequently before the springs 30A,30B,30C come into action friction washer 38 develops a frictional torque capable of minimizing the effects of a possible rebounding of either the hub 10 and web 15 when it comes into action.

It will be noted that the friction washer 38 is freely slidable between the equalizing washer 40 and the web 15 between which it is interposed, of course, except for friction which originates in contact with these members.

Moreover, when the direction of relative angular displacement between the component parts changes, the friction washer 38 is not subjected to any resilient return force so that after the assembly returns to its initial rest position, the radial teeth 47 are no longer in engagement in their centered position in the corresponding notches 17 in the hub, unlike teeth 19 of the web 15, but on the contrary are displaced with respect to this centered position according to the angular displacement this friction washer was previously subjected to.

Axial tab 50 on friction washer 38 insures the return to a suitable angular position, that is, in the zones of operative angular displacement regardless of relative magnitudes of the coefficients of friction between the friction washer and the web and between the same friction washer and the equalizing washer 40, so as to preclude potential jamming of the friction washer and the equalizing washer.

In the course of changes in relative angular displacement of the coaxial parts of the assembly to the opposite direction, the friction washer 38 is, according to an arrangement described above, for the ultimate portion of relative angular displacement between the web 15 and the hub 10, subjected to angular displacement which is all the greater when it follows a large angular displacement.

Thus friction washer 38 starts to come into action only after relatively large oscillations between web 15 and hub 10 by alternating circumferential sliding in one direction then the other in depending on the oscillations.

In practice the operating range of the friction washer in the course of relative angular displacement between the web 15 and the hub 10 is between zero and a maximum magnitude equal to J1+J2.

In any case the friction washer 38 continues after positive engagement of the web 15 with the hub 10 to exert its forces between the two component coaxial parts of the torsion damping assembly.

The present invention is of course not limited to the preferred embodiment just described and illustrated but encompasses all alternatives, modifications and expedients in the scope of the appended claims.

In particular a single meshing member may be provided between the web 15 and hub 10, and it may be either a tooth on one of the members and a notch in the other, the friction washer 38 being equipped with a meshing member of the same type as that on the web 15 with which it is in contact.

In short, the number of meshing members is entirely variable.

Finally according to a modified embodiment the teeth 47 of the friction washer 38 may mesh without play with notches 17 on the hub 10 so that they come into action from the beginning of the angular displacement between the web 15 and the hub 10 and therefore is constantly in operation. In this case no axial tab is needed on the friction washer.

What I claim is:

1. A torsion damping assembly comprising two coaxial members including a hub and a radial web disposed annularly around said hub, said coaxial members being mounted for relative angular displacement over a predetermined sector limited by meshing means including at least one radially oriented meshing member intermeshing with circumferential play with at least one complementary radially oriented meshing member facing the first mentioned meshing member, and a friction washer also having along its inner periphery a radially oriented meshing member similar to the meshing member on said web and also intermeshing with the corresponding meshing member on said hub.

2. Assembly according to claim 1, wherein said meshing member on said friction washer is in engagement with less circumferential play with said meshing member on said hub than said meshing member on said web.

3. Assembly according to claim 1, wherein said meshing member on said friction washer is in engagement without circumferential play with the meshing member on said hub.

4. Assembly according to claim 1, wherein said meshing means on said coaxial members comprise a plurality of teeth alternating with notches meshing with another plurality of teeth alternating with notches, said friction washer also being provided with a plurality of teeth alternating with notches.

* * * * *